United States Patent
Garcia

(10) Patent No.: US 8,274,306 B1
(45) Date of Patent: Sep. 25, 2012

(54) ELECTRONIC LOGIC CIRCUIT WITH PHYSICALLY UNCLONABLE FUNCTION CHARACTERISTICS

(75) Inventor: Joseph P. Garcia, La Plata, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/066,229

(22) Filed: Mar. 31, 2011

(51) Int. Cl.
*H03K 19/00* (2006.01)
(52) U.S. Cl. ............................................. 326/8; 326/47
(58) Field of Classification Search ................ 326/8–15, 326/37–41, 47
See application file for complete search history.

(56) References Cited

U.S. PATENT DOCUMENTS

| | | | | |
|---|---|---|---|---|
| 5,059,839 | A | 10/1991 | Candlelore | 257/679 |
| 6,870,885 | B2 | 3/2005 | LaRocca et al. | 375/240.2 |
| 7,561,059 | B2 | 7/2009 | Diluoffo et al. | 340/638 |
| 8,159,260 | B1 * | 4/2012 | Behrends et al. | 326/8 |
| 2010/0127822 | A1 * | 5/2010 | Devadas | 340/5.8 |
| 2011/0215829 | A1 * | 9/2011 | Guajardo Merchan et al. | 326/8 |
| 2011/0239002 | A1 * | 9/2011 | Beckmann et al. | 713/189 |

OTHER PUBLICATIONS

S. S. Kumar et al.: "Extended Abstract: The Butterfly Puf Protecting IP on every FPGA", *IEEE Intern'l Workshop* . . . , Jun. 2008, 67-70. https://www.cosic.csat.kuleuven.be/publications/article-1154.pdf.

D. Lim et al.: "Extracting Secret Keys from Integrated Circuits", *IEEE Transactions on Very Large Scale Integration*, Systems, 13, 10, 1200-05, Oct. 2005. http://www.csl.cornell.edu/~suh/papers/tvlsi05.pdf.
G. E. Suh et at: "Physical Unclonable Functions for Device Authentication and Secret Key Generation", *Proceedings of the 44th Design Automotive Conference*, Jun. 9-14, 2007. http://www.csl.cornell.edu/~suh/papers/dac07.pdf.
"Importance of Anti-Tamper", Wright Patterson AFB, May 2008. http://at.dod.mil/docs/AT_Brochure.pdf.
R. Anderson, Security Engineering, ©2001, John Wiley. http://www.cl.cam.ac.uk/~rja14/Papers/SE-02.pdf.
*Virtex-4 FPGA User Guide*, ch. 2, UG070 (v2.6), Xilinx® Corp., 2008. http://www.xilinx.com/support/documentation/user_guides/ug070.pdf.

* cited by examiner

*Primary Examiner* — Shawki Ismail
*Assistant Examiner* — Jany Tran
(74) *Attorney, Agent, or Firm* — Gerhard W. Thielman, Esq.

(57) ABSTRACT

A physically unclonable function (PUF) device, with corresponding method, is provided for characterizing an integrated circuit. The PUF device includes a digital clock manager (DCM), a Butterfly circuit incorporated within the integrated circuit, and a shift register. The DCM receives a clock input signal (CLK) and imposes a temporal offset to produce a phase-shift signal (PS). The Butterfly circuit receives a first excite signal as said CLK and a second excite signal as said PS. In response, the Butterfly circuit produces an output that shifts state in response to a non-concurrent change in the CLK and PS. The shift register increments a shift count in response to the output.

6 Claims, 8 Drawing Sheets

ELECTRONIC LOGIC CIRCUIT WITH PHYSICALLY UNCLONABLE FUNCTION CHARACTERISTICS

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to physically unclonable function (PUF) circuits. In particular, the invention relates to incorporation of a Butterfly circuit in conjunction with a Digital Clock Manager (DCM) to provide a PUF.

The United States Armed Forces require processes to render a Field Programmable Gate Array (FPGA) used in military hardware to be secure from tampering. An FPGA represents a configurable type of integrated circuit (IC) whereby the detailed logic design is programmed in after manufacturing by the customer. Selectable programming code for the FPGA can be designed so as to operate only on authorized hardware.

SUMMARY

Conventional integrated circuits yield disadvantages addressed by various exemplary embodiments of the present invention. In particular, various exemplary embodiments provide a physically unclonable function (PUF) device provided for characterizing an integrated circuit. The PUF device includes a digital clock manager (DCM), a Butterfly circuit incorporated within the integrated circuit, and a shift register. The DCM receives a clock input signal (CLK) and imposes a temporal offset to produce a phase-shift signal (PS).

In various exemplary embodiments, the Butterfly circuit receives a first excite signal as said CLK and a second excite signal as said PS. Correspondingly, the Butterfly circuit produces an output that shifts state from a non-concurrent change in the CLK and PS. The shift register increments a shift count in response to the output.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
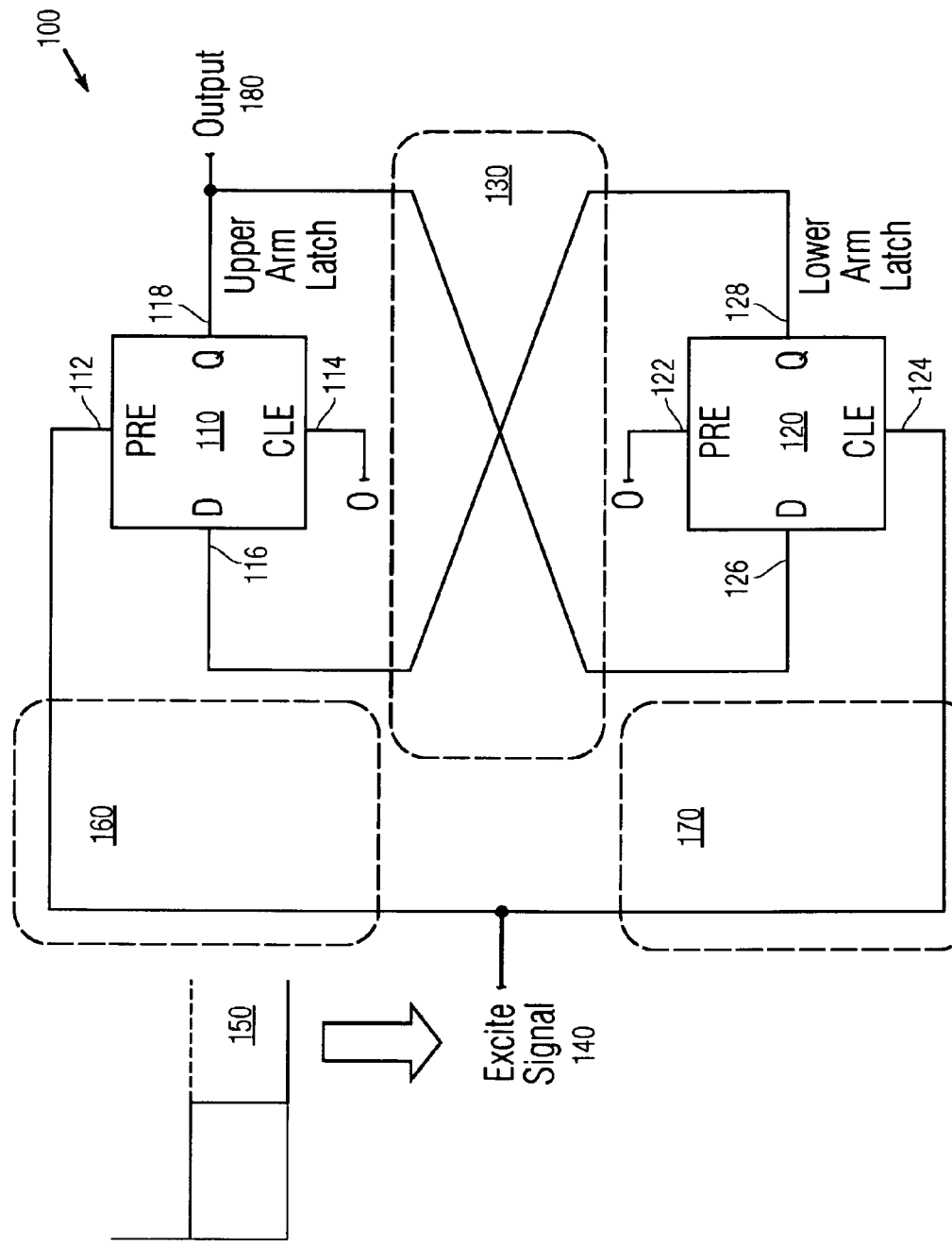
FIG. 1 is a schematic diagram view of a Butterfly circuit.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a floating point gate array (FPGA) or other related component.

Various exemplary embodiments utilize at least one Physically Unclonable Function (PUF) to achieve such security. The PUF constitutes a physical circuit feature that can be embedded in its mechanical structure. Such techniques can be relatively straightforward to evaluate, but difficult to characterize. Such features can be useful in challenge-response type authentication.

For a given model, identical ICs have small unpredictable differences due to random variations in the manufacturing process. These differences can manifest themselves in gate delays. The PUF may be implemented as circuits with built-in race conditions, designed to be sensitive to variation in gate delay from manufacturing process. Each circuit employing a PUF has a unique output for the same input.

A bi-stable circuit known as the "Butterfly" has been proposed for, inter alia, identifying a specific FPGA chip. Conventionally, a Butterfly circuit requires symmetric interconnections which may limit the number of usable FPGA cells that can be utilized to implement the Butterfly circuit. Various exemplary embodiments provide an improved use of a Butterfly circuit whereby the FPGA's Digital Clock Manager (DCM) provides for a phase-shifted excite signal to compensate for asymmetric interconnections. In addition to utilizing all FPGA cells, the approach enables multiple bits of characterization information for each Butterfly circuit as a separate component.

The Butterfly circuit originated by Kumar et al. represents an implementation of a Physical Unclonable Function (PUF). See Sandeep S. Kumar, Jorge Guajardo, Roel Maes, Geert-Jan Schrijen and Pim Tuyls "Extended Abstract: The Butterfly PUF Protecting IP on every FPGA", *IEEE International Workshop on Hardware-Oriented Security and Trust* (June 2008), pp. 67-70 at https://www.cosic.esat.kuleuven.be/publications/article-1154.pdf.

The PUF has been a subject of interest in the security engineering community, as noted by Daihyun Lim, Jae W. Lee, Blaise Gassend, G. Edward Suh, Marten van Dijk and Srinivas Devadas, "Extracting Secret Keys From Integrated Circuits", *IEEE Transactions on Very Large Scale Integration (VLSI) Systems*, v. 13, no. 10 (October 2005), pp. 1200-1205, being available at http://www.csl.cornell.edu/~suh/papers/tvlsi05.pdf, as well as by G. Edward Suh and Srinivas Devadas, "Physical Unclonable Functions for Device Authentication and Secret Key Generation", *Proceedings of the* 44th

*Design Automotive Conference* (June 2007), pp. 9-14, available at http://www.csl.cornell.edu/~suh/papers/dac07.pdf.

The PUF can be employed for the purpose of uniquely identifying a specific electronic circuit such as for detection of counterfeit products, protection against software piracy, and protection of FPGA design Intellectual Property (IP). The PUF may be relevant to prevent cloning and/or reverse engineering of military CT, as described at http://at.dod.mil/docs/AT_Brochure.pdf.

FIG. 1 shows a Butterfly circuit 100 consisting of first and second transparent D-latches 110 and 120 connected in a cross-coupled pattern 130. A latch can be distinguished from a flip-flop by the edge-triggering clock in the latter. Each D-latch 110 and 120 includes a Preset (PRE) gate-lead, a Clear (CLR) gate-lead, a D-input terminal and a Q-output terminal. The gate terminals employ an enable signal to control the latch. In response to the enable signal being active, the D-input propagates directly (i.e., "transparently") through the circuit to the Q-output. The first (upper) D-latch 110 includes the PRE lead 112, the CLR lead 114, the D-input 116 and the Q-output 118. Similarly, the second (lower) D-latch 120 includes the PRE lead 122, the CLR lead 124, the D-input 126 and the Q-output 128.

The operation of the Butterfly circuit 100 begins with an excite signal 140 that provides simultaneous high input to both the PRE lead 112 on the first D-latch 110 and the CLR lead 124 on the second D-latch 120. These denote the exterior-facing leads. The CLR lead 114 on the first D-latch 110 and the PRE lead 122 on the second D-latch 120 constitute the interior-facing leads. Inputs to the interior-facing CLR and PRE leads 114, 122 are set to zero via respective signal pathways. Artisans of ordinary skill will recognize that this represents the "logic" zero, although some physical electronic realizations may represent logical zero with a non-zero quantity of potential or current, e.g., negative voltage. A step decrease 150 (or step increase) in signal voltage represents an exemplary such excitation source that proceeds along control input paths 160 and 170 to the leads for their respective D-latches 110 and 120. The combined output 180 joins both Q-output values 118, 128 from the first and second D-latches 110 and 120.

For typical signaling in a digital system, the excite signal 140 ideally terminates with a precipitous fall-off, such as shown by the decrease 150. Upon cessation of the excite signal 140, the Butterfly circuit 100 occupies an unstable state, eventually attaining an equilibrium whereby the latch Q-output values are either both high or else both low. Because the respective excite signals on the two arms of the circuit 100 cease concurrently, proper function of the Butterfly's circuitry dynamics necessitates that both the excite leads and the cross feedback connections be symmetric with regard to time delay paths.

During this unstable phase, the Butterfly circuit 100 utilizes mutual feedback to provide competitive dynamics between the two latches 110, 120 as arms of the circuit 100. For example, one arm can push the outputs high while the other pushes them low. Variations in the semiconductor manufacturing process, affecting the gate delays, can cause one arm to have a slight temporal advance over the other arm, in the competitive dynamics.

These variations should be unique to a specific FPGA circuit because, like a snowflake, no two circuits of the same product type or model are exactly alike. In particular, a group of Butterfly circuits can be implemented on an FPGA. These Butterflies can be used to identify that specific FPGA by their unique pattern of output bits produced by execution thereon.

This above capability can have significant security engineering applications. For instance, the Butterflies, as part of a challenge-response type system, can be used to prevent execution of proprietary code on another FPGA, and to inhibit software or Intellectual Property (IP) piracy or else reverse engineering of IP. See Ross Anderson, *Security Engineering*, ch. 2: Protocols, John Wiley (2001), available at http://www.cl.cam.ac.uk/~rja14/Papers/SE-02.pdf.

Figure 2A:
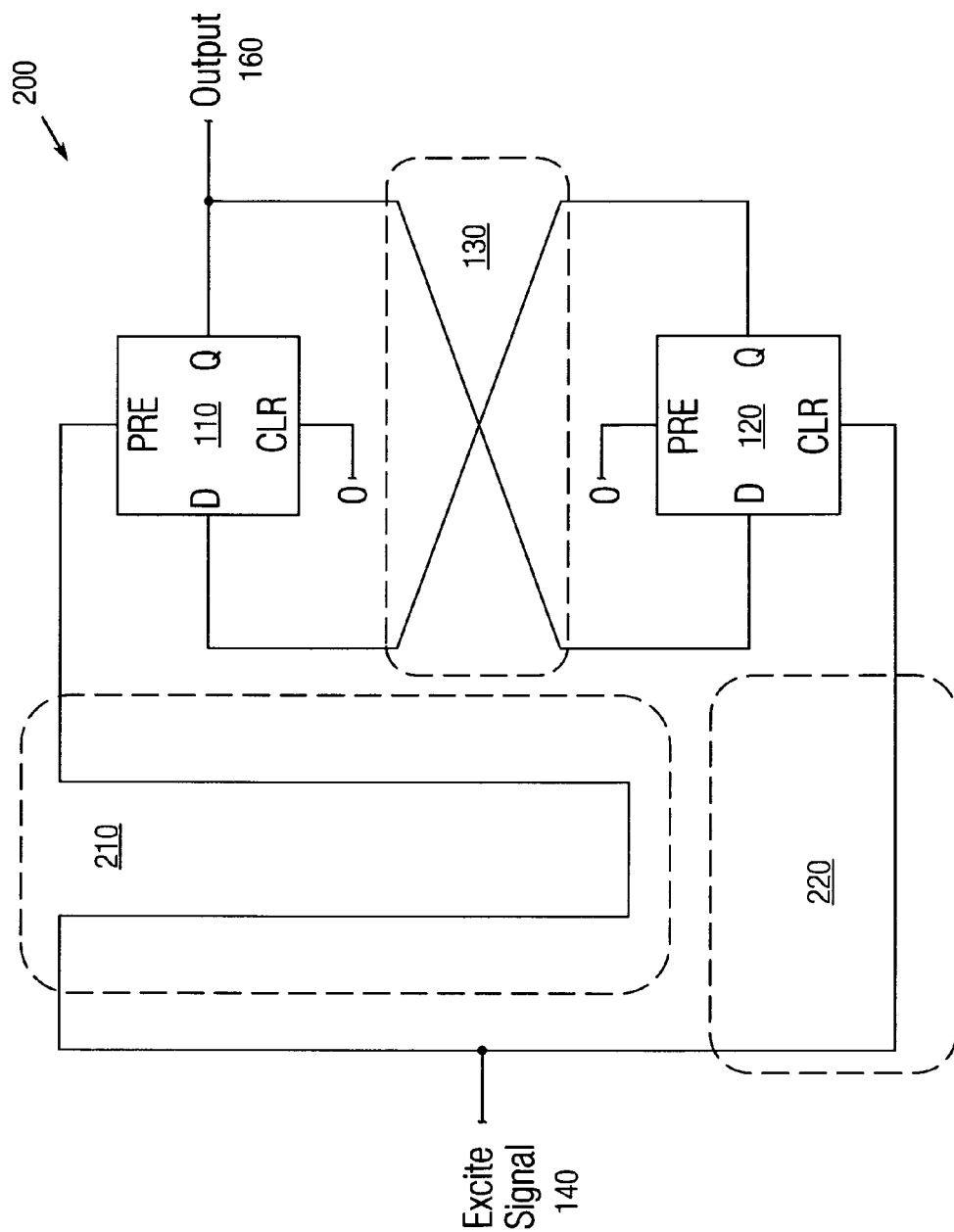
FIGS. 2A and 2B are schematic views of asymmetric circuits.
Figure 2B:
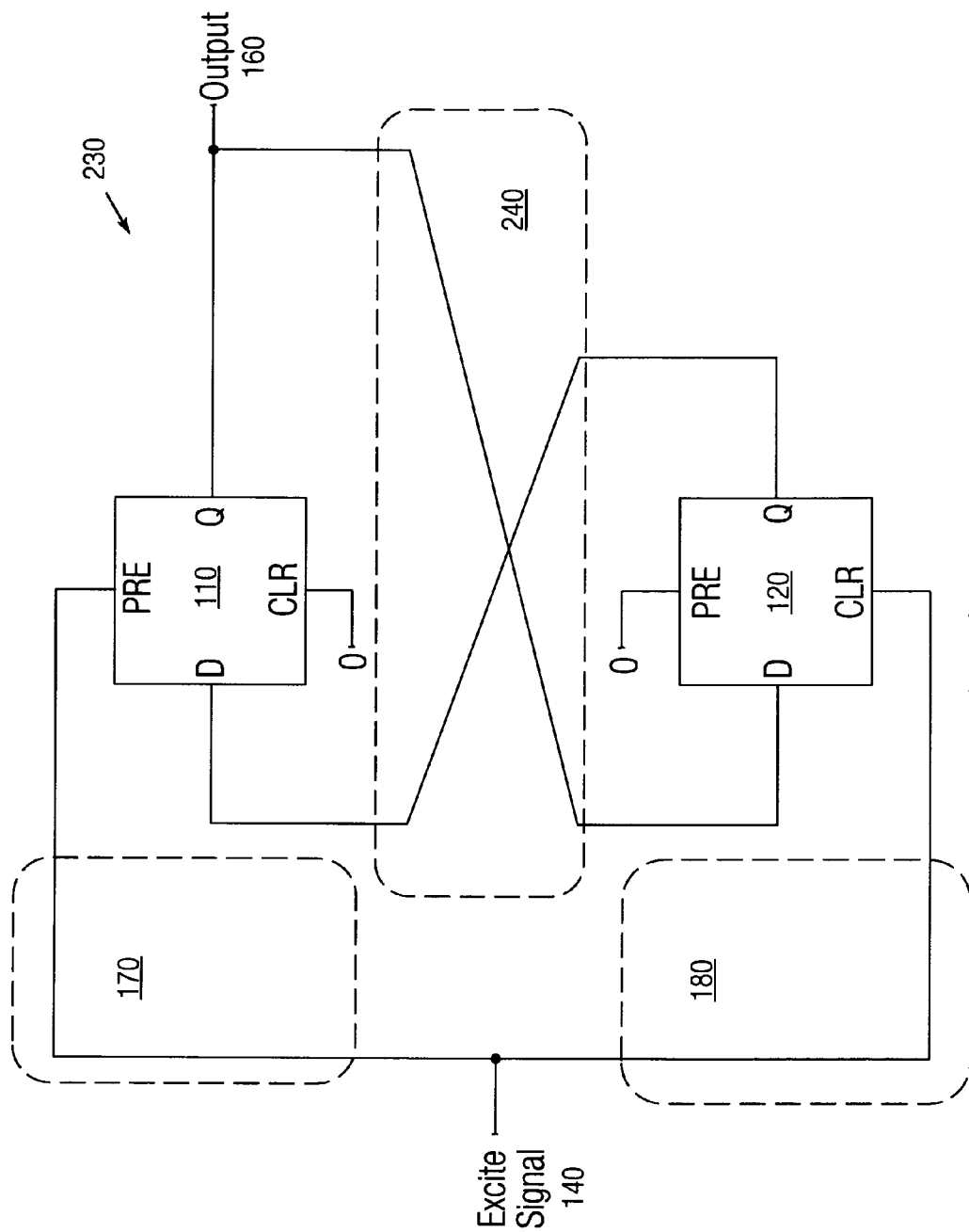

This imposes strict conditions on the layout of interconnects and the number of gates in the FPGA interconnect switch matrix, called a switch box or S-box. However, FPGA matrices may not usually provide for symmetric interconnections as illustrated in FIGS. 2A and 2B. This situation can either affect the Butterfly circuit with regard to the excite signals 140 or the cross coupling signals 130 (or both).

FIG. 2A shows a first non-symmetric excite connection Butterfly circuit 200 having a comparatively long path 210 from the excite signal 140 to the PRE in the first D-latch 110, in contrast to a comparatively short path 220 to the CLR in the second D-latch 120. FIG. 2B shows a second non-symmetric cross-couple Butterfly circuit 230 having a comparatively long path 240 from the Q-output of the first D-latch 110 to the D-input of the second D-latch 120, in contrast to a comparatively short path 250 from the Q-output of the second D-latch 120 to the D-input of the first D-latch 110.

Not only can the absolute lengths of the respective arms vary, but also the number of gates in the interconnection matrix (switch box) may vary from one arm to the other, thereby increasing the effective length of one arm with respect to the other with associated differences in propagation delays. This situation arises because the FPGA designers, due to the inherent trade-off design requirements choose to forego having symmetric interconnections available to every possible pair of FPGA cells, because this would require an impractically large switching matrix that yields too much precious chip real estate devoted to interconnections.

The ability to generate interconnection pathways that comprise a comparatively limited number of switch gates and routing paths of standard lengths, with existing FPGA design practices, enables smaller switch boxes and smaller areas devoted to interconnect pathways. This technique saves space for other circuitry on the FPGA, albeit not usually resulting in symmetric interconnections. This situation appears to limit the number of FPGA cells that can be used to implement Butterfly circuits on some FPGAs.

The restrictive timing tolerances for the Butterfly circuit 100 (and possibly other types of PUFs) are not necessary for the vast majority of circuits implemented on FPGAs. Feedforward circuits have signals that originate from widely separate locations on the chip and thus may require clock skew compensation for synchronization. This is because Butterflies belong to a class of circuits that incorporate feedback whereas the vast majority of FPGA circuits are of feed-forward architectures. In fact, standard accepted FPGA design methodologies discourage incorporation of these types of feedback circuits, which exhibit undesirable behaviors known as race conditions. Often, these race conditions lead to unpredictable behavior when trigged by inputs of variable timing.

The very feedback architectures with associated race conditions represent the essential component for the characterization and identification function as provided in various exemplary embodiments, being driven by the inherent manufacturing variability of ICs. Therefore to provide for the ability to do characterization and identification that can utilize every possible FPGA cell, preferred embodiments overcome the inherent limitations of conventional FPGA architectures with regard to use of circuits containing feedback.

The disclosed embodiments describe an implementation on an FPGA containing a DCM. For additional information on the DCM, See *Virtex*-4 *FPGA User Guide*, ch. 2, UG070 (v2.6), Xilinx® Corp. (1 Dec. 2008) available at http://www.xilinx.com/support/documentation/user_guides/ug070.pdf. Advanced FPGA designs such as the Xilinx Virtex series (e.g., Virtex-4) use the DCM, for among other things, clock frequency synthesis, clock skew correction and jitter correction.

As a byproduct for supporting some of the aforementioned functions, the DCM can implement a phase-shifted version of the clock signal using a Digital-delay Locked Loop (DLL). Phase-shifting applied to one arm of the Butterfly circuit 100 can correct for the asymmetry of the interconnection. The Xilinx Virtex-4 DCM can support up to 1024 discrete increments of clock phase-shift.

Figure 3:
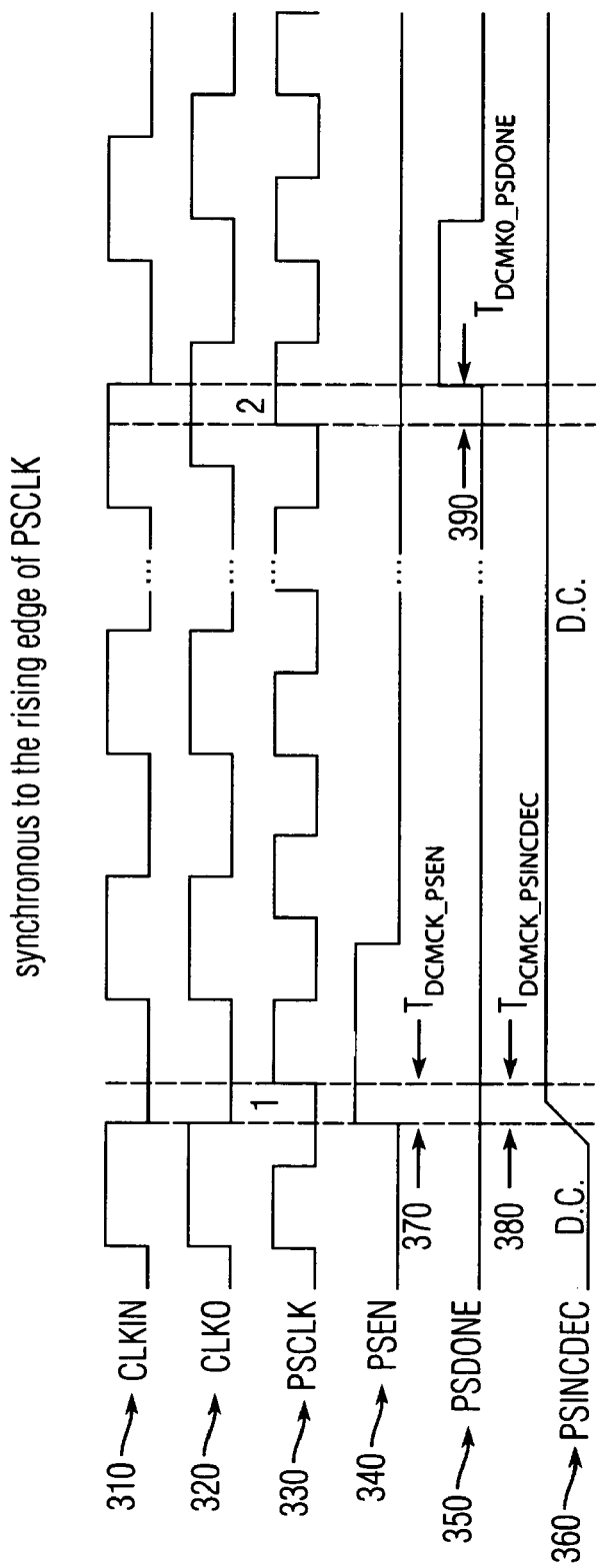
FIG. 3 is a chronographic view of clock and excite signals.

FIG. 3 provides a temporal diagram (e.g., an illustration timeline) 300 of signal edges for a digital DLL. The timeline 300 includes signal edge traces for input clock CLKIN 310, shift clock CLKO 320, phase-shift clock PSCLK 330, phase-shift enable signal PSEN 340, completion signal PSDONE 350 and phase-shift input coder-decoder PSINCDEC 360.

A first delay 370 temporally separates the leading CLKIN 310 and following PSEN 340 signals. An analogous similar delay 380 separates the CLKIN 310 and PSINCDEC 360. A second delay 390 temporally separates the leading PSCLK and following CLKIN 310. This process supports variable phase-shift. On the Virtex-4 FPGA, up to 1023 discrete phase increments can execute across the entire $2\pi$ (i.e., 0° to 360°) phase-shift, with ~260 clock cycles to implement phase-shift increment.

Figure 4:
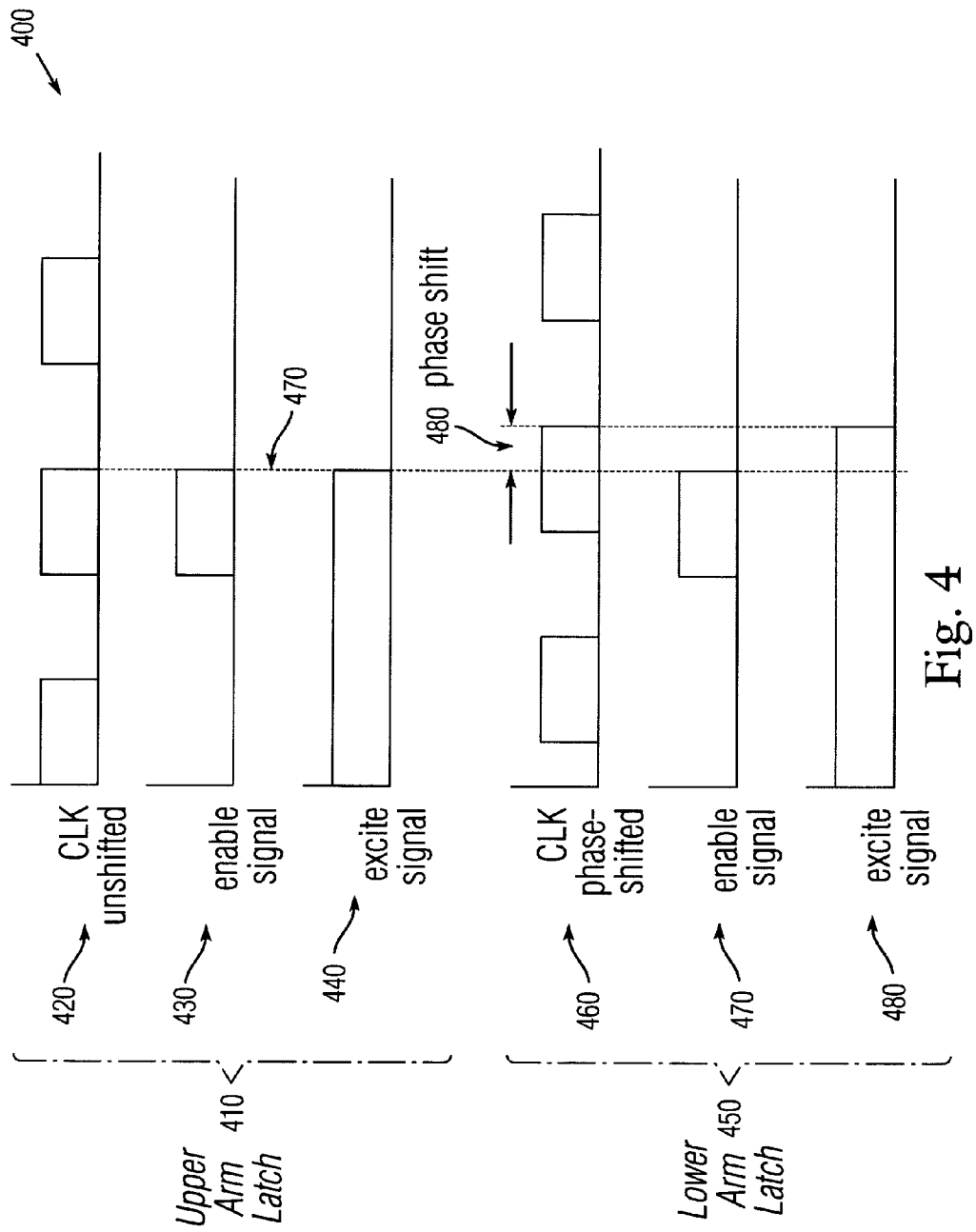
FIG. 4 is a chronographic view of a phase shift.

FIG. 4 shows a temporal diagram 400 comparing edge signals between the upper and lower arm latches 110 and 120. In this example, a phase-shifted excite signal on the lower arm provides for simultaneous excitation. Behavior of the two latches can be used to generate an excite signal 140 for the Butterfly circuit 100.

An upper arm latch signal 410 for the upper latch 110 exhibits a clock (CLK) unshifted signal 420, an enable signal 430 and an excite signal 440. A lower arm latch signal 450 for the lower latch 120 exhibits a CLK phase-shifted signal 460, an enable signal 470 and an excite signal 480. A phase-shift 480 distinguishes the CLK and excite signals between the latches 110 and 120 by a temporal offset. This illustrates respective effects of latch input CLK signals, input enable signals and output excite signals for latches of upper and lower arms, whereby the output of the lower arm excite signal is phase-shifted with respect to upper arm.

Figure 5:
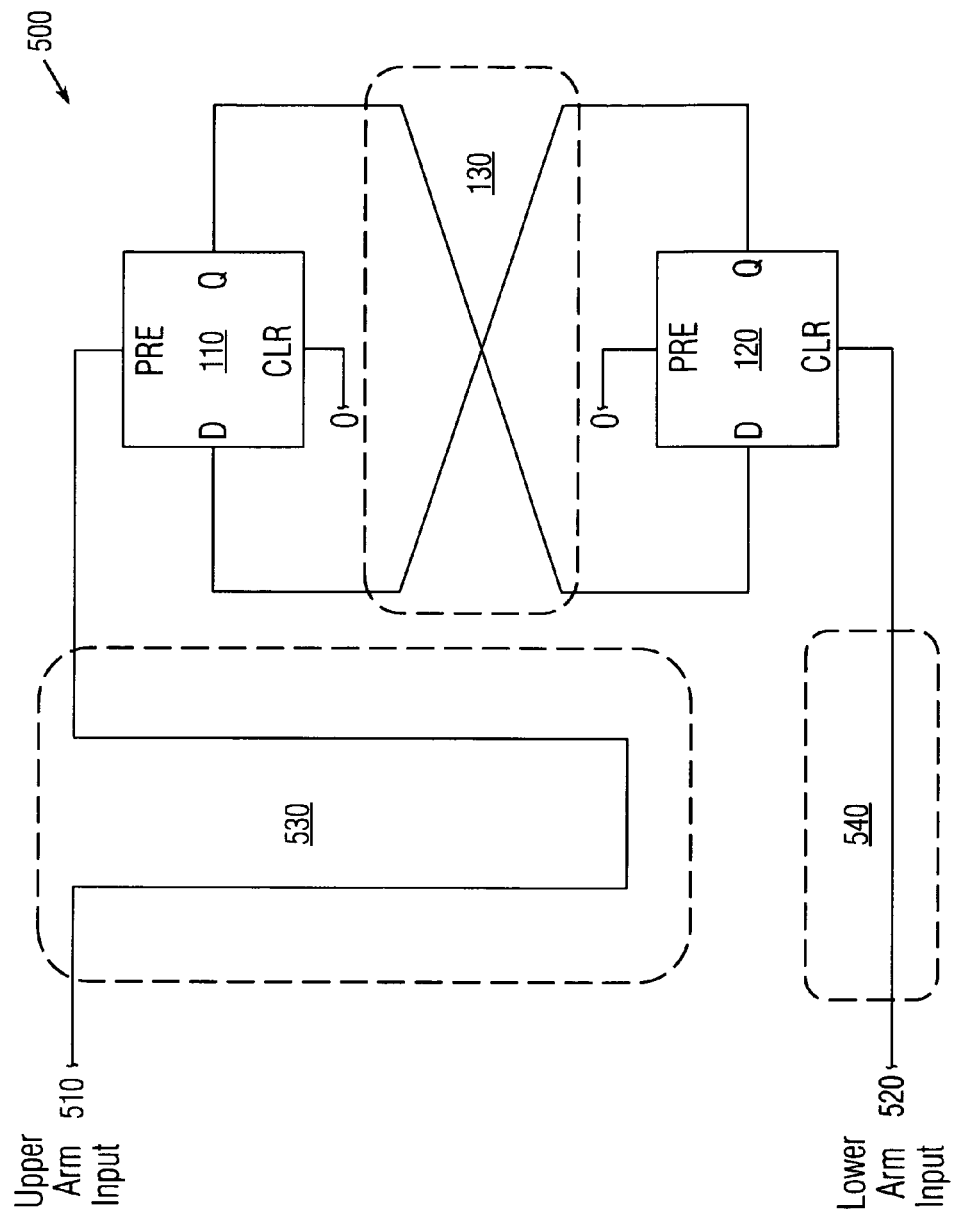
FIG. 5 is a schematic view of a Butterfly circuit with separate excite inputs.

FIG. 5 shows a Butterfly circuit 500 with upper and lower inputs 510, 520 (similar to connection circuit 200) having a comparatively long path 530 from the excite signal 140 to the PRE in the first D-latch 110, in contrast to a comparatively short path 540 to the CLR in the second D-latch 120. The relative conductive length difference between the paths 530 and 540 produces the delay-induced phase-shift 580.

Figure 6:
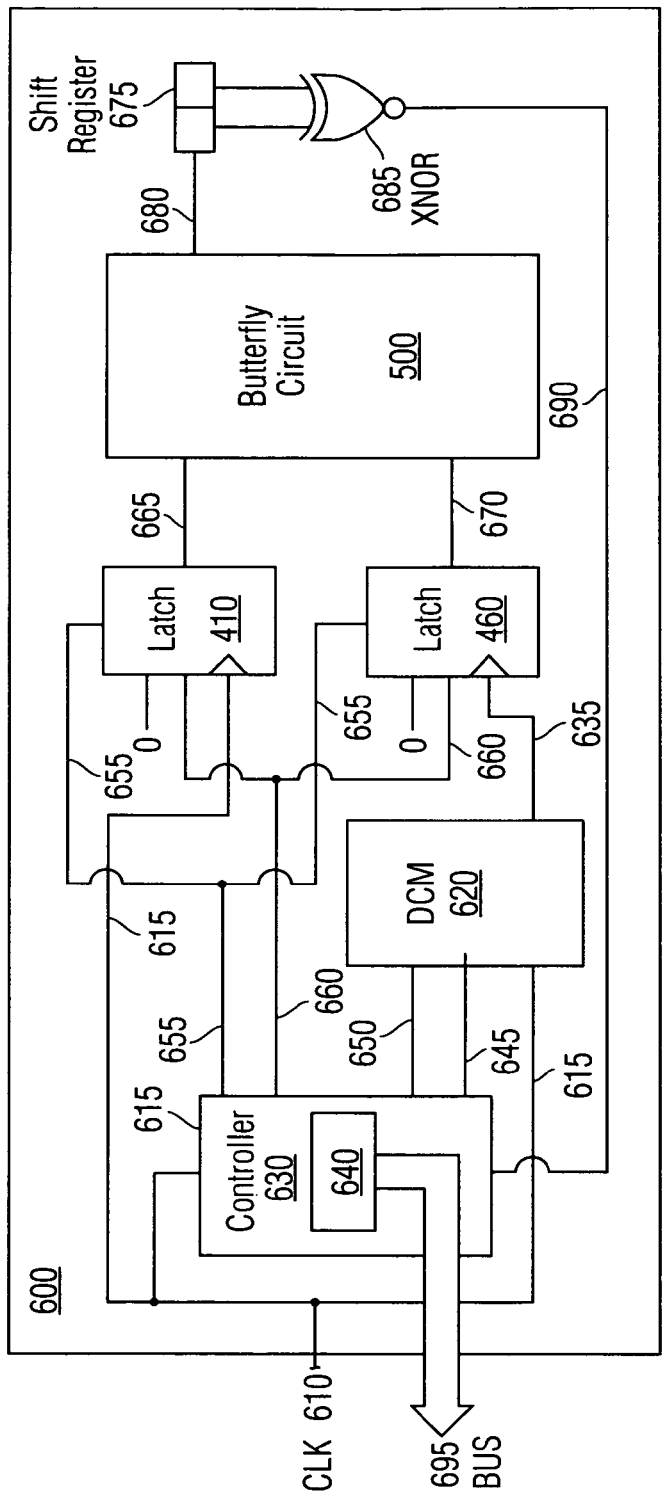
FIG. 6 is a schematic view of delay correction circuitry.

FIG. 6 illustrates a delay correction circuit 600 for implementation of Controlled Phase-shifting with the Butterfly PUF. During an operational execution, the circuit 600 sequentially increments through a sequential range of clock phase-shifts and initiates the operation of the Butterfly circuit 500 for each phase-shift increment. This delay correction circuit 600 may be implemented on an FPGA from a pre-programmed configuration file, otherwise known as a bit code.

In this circuit 600, an input clock signal 610 can be conveyed directly by first branching signal pathways 615 to a DCM 620, a controller 630 and to the upper arm latch 410. The circuit 600 uses the DCM 620 to correct for asymmetric interconnection delays by inducing a range of phase delays on the lower input arm of the Butterfly circuit 500 under characteristic evaluation. A corresponding lower arm latch 460 receives output from the DCM 620 through which a phase-shifted clock signal conveys to the lower latch 460 by a first direct signal pathway 635.

The DCM 620 is controlled by the aforementioned controller 630 containing a register 640 holding a value that represents the number of phase-shift increments. During an operational run, at the beginning of a phase increment cycle, the controller 630 initiates a clock phase-shift change signal through a second direct signal pathway 645. A third signal pathway 650 may serve for auxiliary functions. Upon completion of the phase-shift, the controller 630 receives an acknowledgment signal through a third direct signal pathway 460, whereby the controller 630 increments the counter register 640.

Via second and third branching signal pathways 655 and 660, the controller 630 affects the latches 410 and 460 connected respectively to the upper and lower inputs of the Butterfly circuit 110. The latches 410 and 460 are asynchronously gated D-type latches with PRE gate inputs. The latches 410 and 460 provide the Butterfly circuit's excite signal 140 with the controller 630 connected to the respective clock or clock-enable inputs.

These connections operate via the second branching signal pathway 655 and the respective PRE gate inputs via the third branching signal pathway 660 with clock (CLK) inputs unshifted from the first branching signal pathways 615 and phase-shifted from the first direct signal pathway 635 through the latches 410 and 460. This provides respectively for excite signals that are in phase with the corresponding un-phase-shifted and phase-shifted clock signals.

The aforementioned D-type latches 410 and 460 are distinct, being in addition to latches contained within the Butterfly circuit 500. Eventually during a cycle, about the time a phase-shift is initiated, a signal to raise the Butterfly circuit's excite signal 140 to high asserts for a limited period (approximately the clock cycle's duration) to the PRE inputs of the latches 410 and 460 via the aforementioned third branching signal pathway 660, the excite signals being conveyed to respective upper and lower input arms of the circuit 500 via fourth and fifth direct signal pathways 665 and 670.

Immediately after completion of the phase-shift, a gate (or clock) enable signal for the latches 410 and 460 can be imposed for a finite time (about the duration of a clock period) to the gate enable inputs via the second branching signal pathway 655. This sets the excite signals 140 on the fourth and fifth and direct signal pathways 665 and 670 to low at the respective instants that their corresponding un-shifted and shifted clock signals are input to latches 410 and 450 via the first and second respective direct signal pathways 615 and 635.

Upon the switching off of the excite signals, with one arm having delay relative to the other to compensate for interconnection asymmetries, the Butterfly circuit 500 undergoes competitive dynamics converging on a stable output state sometime shortly after the initiation of the operation of the circuit 500. As described in Kumar et al., upon attaining equilibrium, the circuit 500 outputs either a high or low voltage signal.

Upon proceeding through a range of phase-shifts, when the Butterfly circuit's output changes from high to low (or the converse), the process stops. A two-bit shift register 675 receives an output from the Butterfly circuit 500 from a sixth direct signal pathway 680, having each bit connected to an XNOR gate 485 used to detect the change in output of the circuit 500.

The shift register 675 stores the current output and the previous output, corresponding to the previous phase-shift increment. In a special initialization example, the beginning of an operative execution over a range of DCM increments, the output of both bits in the shift register 675 may be set to the output of the Butterfly circuit 500. For each subsequent DCM increment, only the leftmost bit sets to the output of the Butterfly circuit 500 as conveyed by the signal pathway 680. The specific count of phase-shift increments characterizes a particular implementation for the Butterfly circuit 500. Upon detecting a change in output, the XNOR gate 685 sends a signal back to the controller 630 via a seventh direct signal pathway 690, stopping the process. The value contained in register 640 can be read out by a data bus 695.

These embodiments provide multiple bits of characterization information that correspond to the number a phase increments required to change the output of the Butterfly circuit 500. Many of the bits (particularly the high value bits) represent the gross delay imposed by the interconnection architecture's asymmetry, but some of the bits (particularly those having low value) represent the specific chip delay due to the unique chip manufacturing variation.

Because the phase-shifting of the DCM 620 compensates for the interconnection asymmetry, any combination of FPGA cells can be utilized without concern for asymmetry delays in the Butterfly circuit's cross connections 130. Thus, the gate input (or clock input) on the Butterfly circuit's latches 110 and 120 of FIG. 1 may be optional.

A group of multiple circuits in the manner of the above can be implemented on a single FPGA and should provide some number of bits for characterization that can be used in a manner such as a unique identifier. A test program could be accomplished using implementations of the above circuits to provide sufficient characterization and identification information to the required number of bits for security, anti-piracy and anti-tamper applications such as challenge-response algorithms.

Because FPGAs have many cells and multiple DCMs, the challenge involves incorporating the specific FPGA cells for the Butterfly circuits and/or the specific DCMs. The output bits from multiple circuits of the above type implemented on a single, specific FPGA may be combined and manipulated by mathematical formula to provide for various functions such as error correction due to random noise and hashing to emphasize the unique bits due to manufacturing variation from the bits due to the architecturally imposed delay. The phase relationship versus the number of phase-shift increments of the DCM may depart from a perfect linear relationship.

Each FPGA may have multiple DCMs, each of which has a non-linear component of its phase response. These non-linear responses may be incorporated as an alternate mechanism to provide specific FPGA characterization and identification information. For instance the phase response as a function of the increment value may be a polynomial function, the set of representative polynomial coefficients of which would characterize the specific DCM of a specific FPGA to be used for identification bits.

Conventional designs indicated the following problems:
(a) Asymmetric interconnections;
(b) Non-uniform signal delays between arms;
(c) FPGA Architectural characteristics overwhelm manufacturing variability; and
(d) Same output for any FPGA on most implementations of Butterfly circuits.

Exemplary embodiments provide an FPGA DCM to compensate for asymmetry. The advantages include:
(a) Modern FPGAs have DCMs to support clock de-skew;
(b) Phase-shift can be induced;
(c) Compensation for asymmetric interconnection signal delay variability can be performed;
(d) Measurement of manufacturing variability can be enabled; and
(e) More than one bit ID info per Butterfly circuit can be included.

Figure 7:
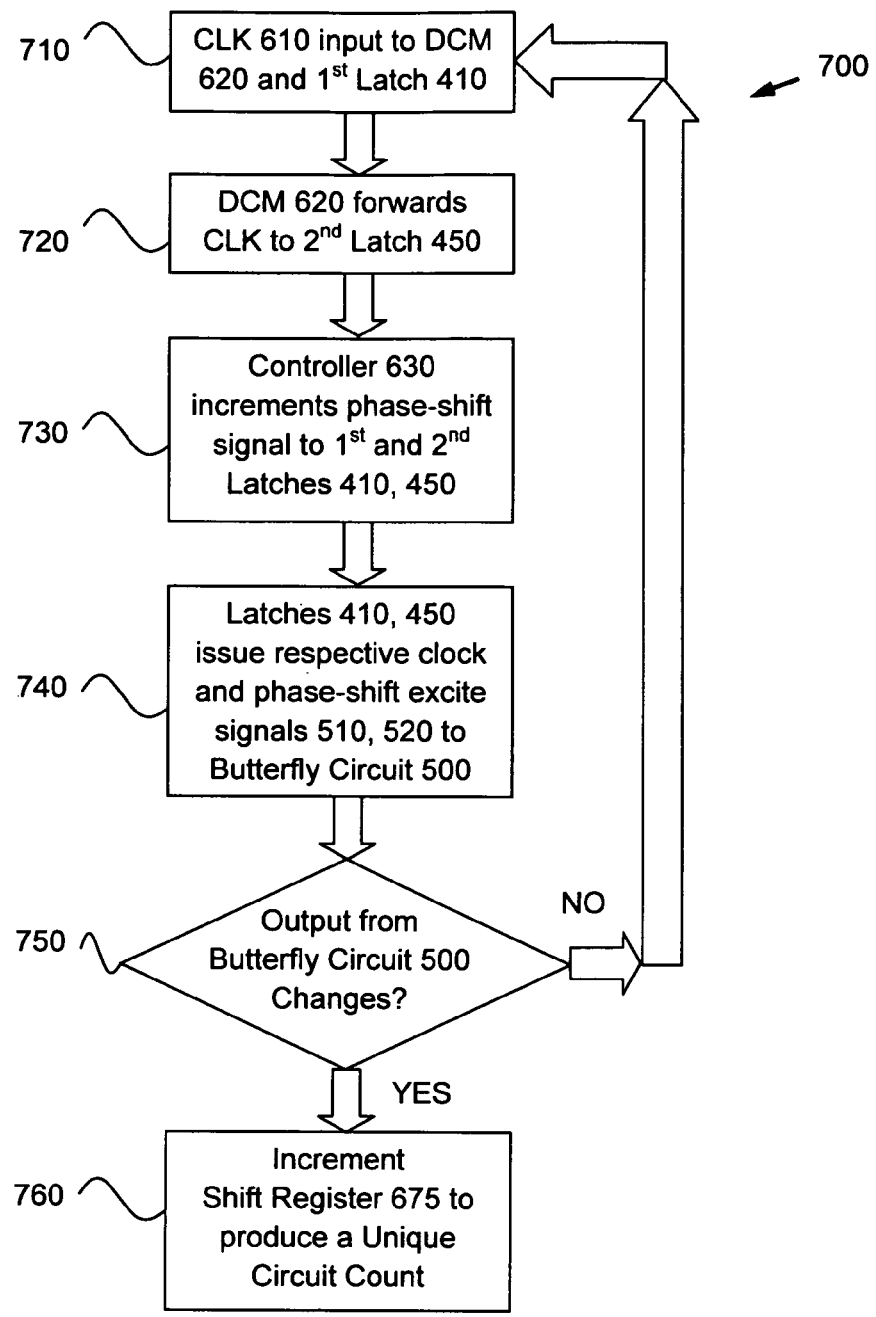
FIG. 7 is a block diagram view of an analysis process flowchart.

FIG. 7 shows a flowchart 700 exemplifying the operations described for the delay correction circuit 600. At a first step 710, a clock (CLK) input 610 issues to the DCM 620 and a first (upper) latch 410 during a clock cycle. At a second step 720, the DCM 620 forwards the CLK input 610 to a second (lower) latch 450. At a third step 730, the controller 630 increments phase-shift signals for controlling the latches 410 and 450. At a fourth step 740, the latch 410 issues the CLK excite signal 440 as well as the second latch 450 issues the phase-shift excite signal 480. In response to these signals, the Butterfly circuit 500 issues an output signal to the shift register 675.

At a logic query for the fifth step 750, if the output signal has changed from the previous clock cycle, then the shift register 675 increments a circuit counter in response at a sixth step 760. Otherwise, the process returns to the first clocking step 710. The number of counts in a shift register for a particular series of clock cycles constitutes a unique value for each circuit 600 to be evaluated. The value can be reported via the bus 695 to a database for resource compilation.

Preliminary results have shown high accuracy for the approach described herein. Two identical Virtex-4 FPGAs have been tested. On multiple FPGAs, the error between matching butterflies implemented on matching FPGA cells is about two orders of magnitude less than the non-matching cells.

The Butterfly circuit incorporated in combination with the Digital Clock Manager (DCM) enables differences in arms to provide electronic distinctions, such as by phase-shifted excite and clock signals. A specific FPGA, such as including a Butterfly circuit 500, may thus be characterized or identified by assessing the number of phase-shift increments that results in a Butterfly circuit changing its output from high to low or conversely, from low to high.

This process includes characterization and/or identification of a specific IC using an evaluation circuit that implements a race condition in conjunction with a phase-shifted input. For various exemplary embodiments, the input has a variable phase-shifting, such that the evaluation circuit exhibits a change in behavior by a phase-shifted signal at a specific phase-shift increment, such that the specific value of the phase-shift or the specific phase-shift increment is utilized in the characterization and/or identification of the circuit.

This process can be employed to characterize and/or identify a specific FPGA or other IC by resulting identification bits in a challenge-response or related security algorithm for the purpose of IP protection, thereby inhibiting software piracy, anti-counterfeiting and/or as a defense against reverse engineering. This includes any manner of mathematically combining and/or manipulating said bits from multiple units of the aforementioned circuits to form products, moments, ratios and/or any kind of characterization via some mathematical formula for the purpose of specifically identifying an FPGA or some type of IC.

Any programming, bit codes or IP implementing the aforementioned circuit on an FPGA. A challenge response having an input "challenge" involving the selection of specific FPGA cells, routing paths and/or specific DCMs. Use of any non-linearities in the DCM as a source of identifying information. Upon cessation of excite signal, depending on manufacturing variability, the latches reach equilibrium with both simultaneously having either high or low output at each Q-output lead.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A physically unclonable function (PUF) device for characterizing an integrated circuit, said device comprising:
    a digital clock manager (DCM) that receives a clock input signal (CLK) and imposes a temporal offset to produce a phase-shift signal (PS);
    a Butterfly circuit incorporated within the integrated circuit, said Butterfly circuit receiving a first excite signal as said CLK and a second excite signal as said PS to produce an output that shifts state in response to a non-concurrent change in said CLK and PS; and
    a shift register to increment a shift count for said output.

2. The PUF device according to claim 1, further including:
    a first latch for receiving said CLK and forwarding as said first excite signal; and
    a second latch for receiving said PS and forwarding as said second excite signal.

3. The PUF device according to claim 2, further including a controller that controls said DCM and said first and second latches.

4. The PUF device according to claim 3, wherein said controller receives said shift count for a circuit database.

5. A physically unclonable function (PUF) method for characterizing an integrated circuit, said method comprising:
    submitting a clock signal (CLK) to a digital clock manager (DCM) and to a first excite input of a Butterfly circuit incorporated within the integrated circuit;
    imposing a temporal offset by said DCM to produce a phase-shift signal (PS);
    forwarding said PS to a second excite input of said Butterfly circuit;
    registering an output of said Butterfly circuit that shifts state in response to a non-concurrent change in said CLK and PS; and
    incrementing a shift register in response to said output as a shift count.

6. The PUF method according to claim 5, further including:
    controlling said CLK and PS via first and second latches that submit respective said first and second excite inputs to said Butterfly circuit.

* * * * *